United States Patent [19]

Shirota et al.

[11] Patent Number: 5,110,356
[45] Date of Patent: May 5, 1992

[54] INK, AND RECORDING PROCESS USING THE SAME

[75] Inventors: Katsuhiro Shirota, Kawasaki; Tsuyoshi Eida, Yokohama; Megumi Saito, Kawasaki; Takao Yamamoto, Isehara, all of Japan

[73] Assignee: Canon Kabushiki Kaisha, Tokyo, Japan

[21] Appl. No.: 752,206

[22] Filed: Aug. 21, 1991

Related U.S. Application Data

[63] Continuation-in-part of Ser. No. 473,060, Jan. 31, 1990, abandoned.

[30] Foreign Application Priority Data

Feb. 2, 1989 [JP] Japan .................................. 1-22485

[51] Int. Cl.$^5$ .............................................. C09D 11/00
[52] U.S. Cl. ................................... 106/22; 106/20
[58] Field of Search .......................................... 106/22

[56] References Cited

U.S. PATENT DOCUMENTS

| 2,427,539 | 9/1947 | Wehrli .................................. 534/811 |
| 4,295,889 | 10/1981 | Eida et al. ............................ 106/22 |
| 4,435,717 | 3/1984 | Eida et al. ............................ 346/1.1 |
| 4,778,525 | 10/1988 | Kobayashi et al. .................... 106/20 |
| 4,804,411 | 2/1989 | Eida et al. ............................ 106/22 |
| 4,841,037 | 6/1989 | Ohta et al. ............................ 534/815 |

FOREIGN PATENT DOCUMENTS

| 0213497 | 3/1987 | European Pat. Off. . |
| 3619573 | 12/1986 | Fed. Rep. of Germany . |
| 659320 | 9/1964 | Italy . |
| 059936 | 5/1979 | Japan . |
| 093766 | 5/1984 | Japan . |
| 093768 | 5/1984 | Japan . |
| 754562 | 8/1956 | United Kingdom . |
| 903369 | 8/1962 | United Kingdom . |

Primary Examiner—William R. Dixon, Jr.
Assistant Examiner—Margaret V. Einsmann
Attorney, Agent, or Firm—Fitzpatrick, Cella, Harper & Scinto

[57] ABSTRACT

The present invention provides an ink comprising a dye and a liquid medium, wherein said dye is a dye of Formula (I):

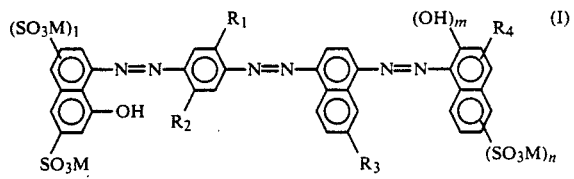

wherein $R_1$ and $R_2$ represent independently an alkyl group, an alkoxy group or an acetylamino group; $R_3$ represents —$SO_3M$ or a hydrogen atom; $R_4$ represents a hydrogen atom, —$SO_3M$ or —$NHR_5$, where $R_5$ represents a hydrogen atom, a phenyl group that may have a substituent, or a group of the formula

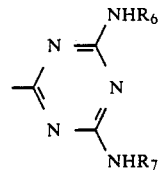

where $R_6$ and $R_7$ represent independently a hydrogen atom or —$C_2H_4OH$; M represents an alkali metal, an ammonium group or an organic ammonium group; and l, m and n represent independently an integer of 0 or 1.

3 Claims, 3 Drawing Sheets

INK, AND RECORDING PROCESS USING THE SAME

This application is a continuation-in-part, of application Ser. No. 07/473,060 filed Jan. 31, 1990, now abandoned.

BACKGROUND OF THE INVENTION

1. Field of the Invention

The present invention relates to an ink, and a recording process using it. More particularly, it relates to a Water based ink capable of giving a black image improved in indoor color change resistance, and a recording process, in particular, ink yet recording process, using the ink.

2. Related Background Art

Water-based inks comprising a water soluble dye dissolved in a water-based medium have been hitherto used as inks used in mountain pens and felt pens and inks used for ink-jet recording. In these water based inks, water-soluble organic solvents are commonly added so that pen points or ink ejection nozzles can be protected from being clogged with ink It is required for these conventional inks to give an image with a sufficient density, not to cause any clogging at pen points or nozzles, to have good drying properties on recording mediums, to cause less feathering, to have an excellent shelf stability, and, particularly in ink jet recording systems utilizing heat energy, to have an excellent thermal fastness. It is also required for &he image formed to have a satisfactory light fastness and a water fastness.

Inks with various hues are also prepared from dyes with various hues. Of these, black inks, which are used in both monochromatic and full color images, are most important inks. As dyes for these black inks, C.I. Food Black 2 has been mainly used taking account of various performances (see Japanese Patent Laid-open No. 59-93766 and Nu. 59-93768).

Among the various required performances, what is particularly important is the fastness of the images formed.

In regard to the fastness of images, hitherto mainly questioned is the color fading due to direct sunlight or every kind of illumination light. Such a problem of color-fading has been attempted to be settled by the selection of dyes having a superior light fastness.

Recently, however, a problem of color changes of images has become important in addition to the above color fading. Namely, images formed by conventional inks have not only the problem of color fading but also the problem of color changes. The color changes refer to changes in hues with, however, less changes in density, and what is important in black inks particularly used in a largest quantity is a problem of the browning that black turns brown. In particular, in the instance of full-color images, this browning results in a great lowering of image quality.

The browning also occurs indoors without exposure to direct sunlight. The color change is also accelerated depending on the types of recording mediums on which images are formed, and the browning has been unavoidable in respect of the C.I. Food black 2 that has been hitherto widely used.

In particular, in such an instance of so-called coated papers having an ink-receiving layer containing a pigment and a binder on a substrate such as paper, for the purpose of improving the color forming performance of ink and the image quality such as sharpness and resolution the browning has seriously occurred even with use of inks that have caused less problem of color change in the instance of plain papers. This problem has been unsettled by the mere selection of dyes having a superior light fastness.

SUMMARY OF THE INVENTION

Accordingly, an object of the present invention is to provide an ink that can satisfy the performances commonly required as mentioned above and also may not cause browning even on the coated papers, and a recording process using this ink.

The above object can be achieved by the present invention as described below.

The present invention provides an ink, and a recording process using the ink, containing at least a dye and a liquid medium, Wherein said dye is a dye of Formula (I):

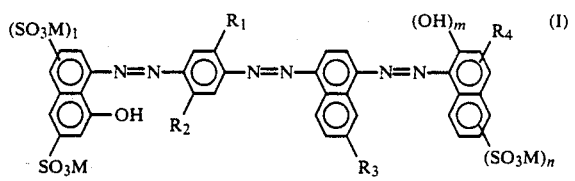

wherein $R_1$ and $R_2$ represent independently an alkyl group, an alkoxy group or an acetylamino group; $R_3$ represents $-SO_3M$ or a hydrogen atom; $R_4$ represents a hydrogen atom, $-SO_3M$ or $-NHR_5$, where $R_5$ represents a hydrogen atom, a phenyl group that may have a substituent or a group of the formula

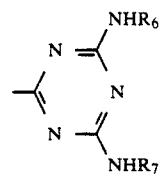

where $R_6$ and $R_7$ represent independently a hydrogen atom, or $-C_2H_4OH$ represents an alkali metal, an ammonium group or an organic ammonium group; and l, m and n represent independently an integer of 0 or 1.

DETAILED DESCRIPTION OF THE PREFERRED EMBODIMENTS

Figure 1A:
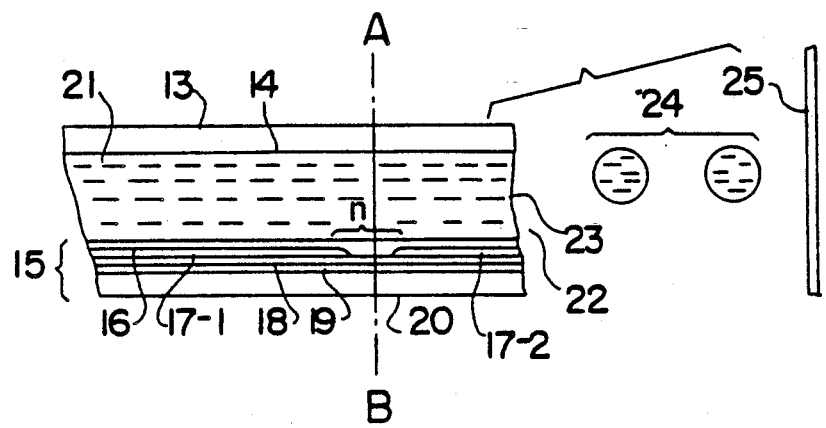
FIGS. 1(a) and 1(b) are respectively a longitudinal sectional view and a cross-sectional view of the head part of an ink jet recording device.

Use of the dyes of the above Formula (I) as the dye for the ink makes it possible to provide a black ink capable giving an image that may not cause the indoor color changes, i.e., the browning, even when the coated papers are used.

In the recording process of the present invention, use of the above ink makes it possible to provide a black image Which has less browning on the coated papers.

The present invention will be described below in greater detail by giving preferred embodiments.

Black dyes used in the present invention may all commonly comprise sodium salts of water soluble groups such as a sulfonic acid group. In the present invention, however, they are no& limited to the sodium salts, and the same effect can be obtained also When the counter ion thereof is potassium, lithium, ammonia, organic amine, or the like. Thus, the dyes containing any of these other counter ions are also included in the present invention. Examples of the dye represented by the above Formula (I) include the following dyes, but are by no means limited to these.

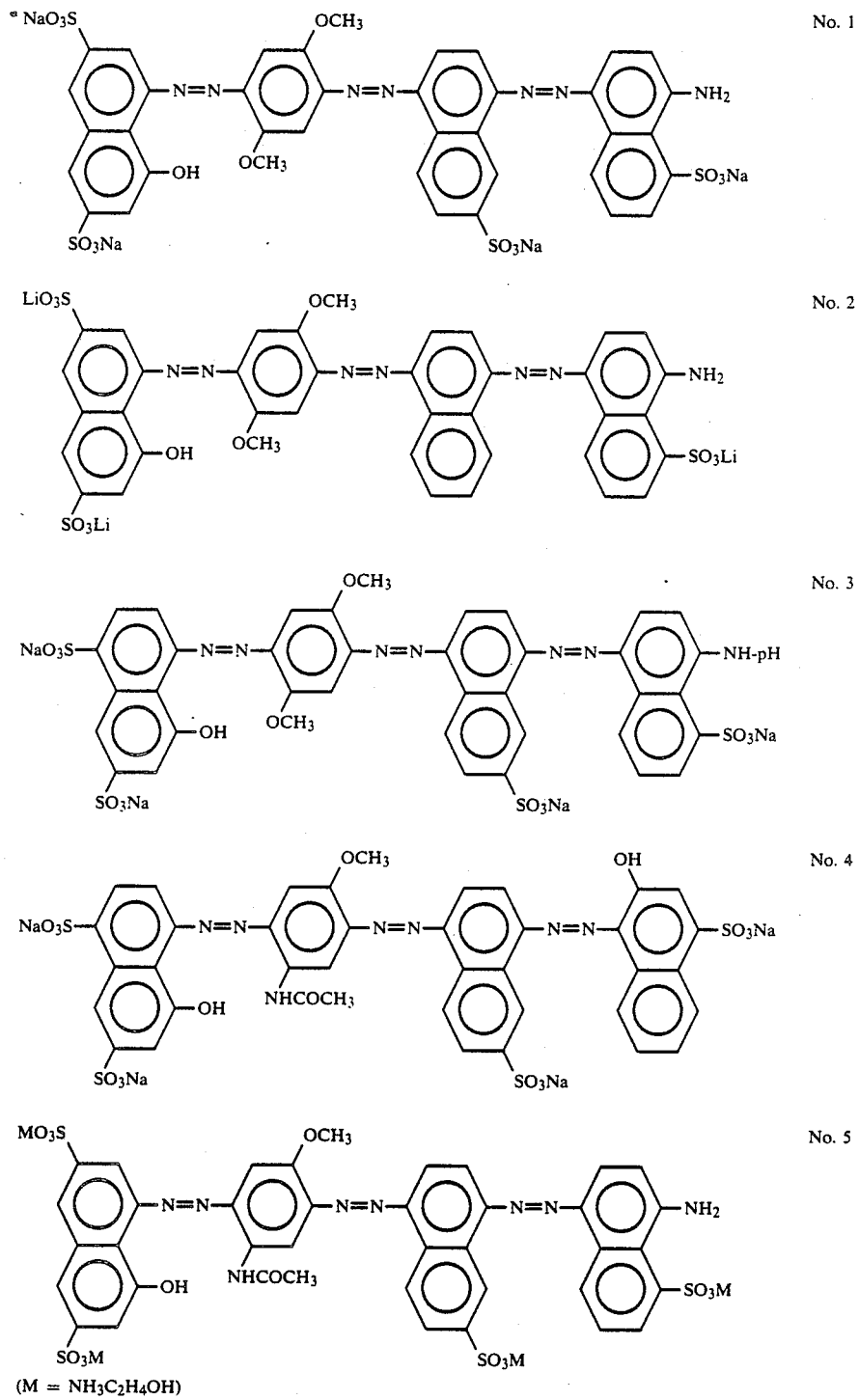

-continued
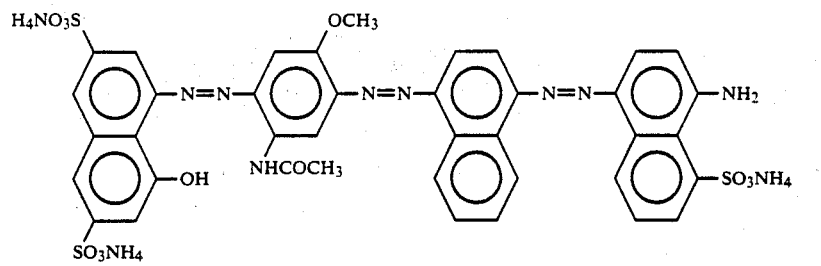
No. 6
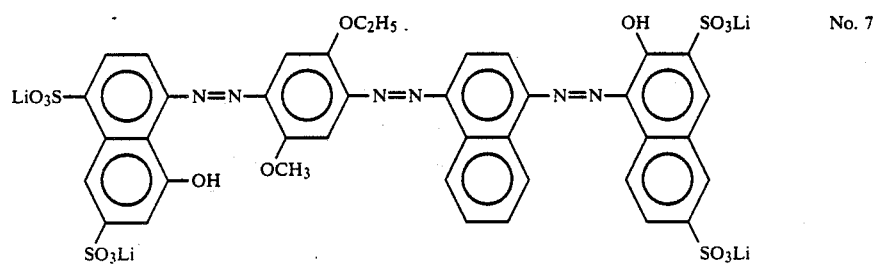
No. 7
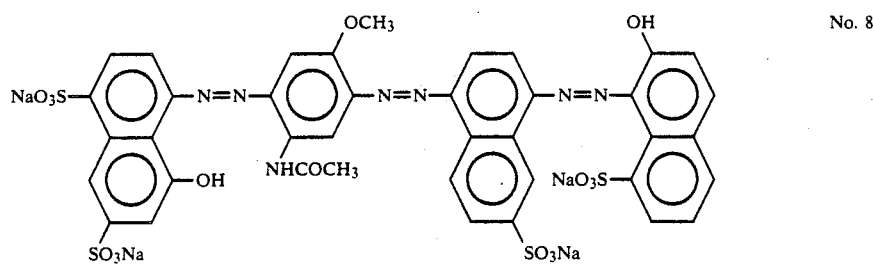
No. 8
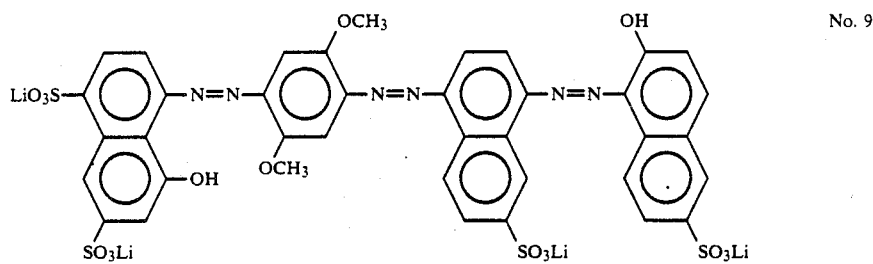
No. 9
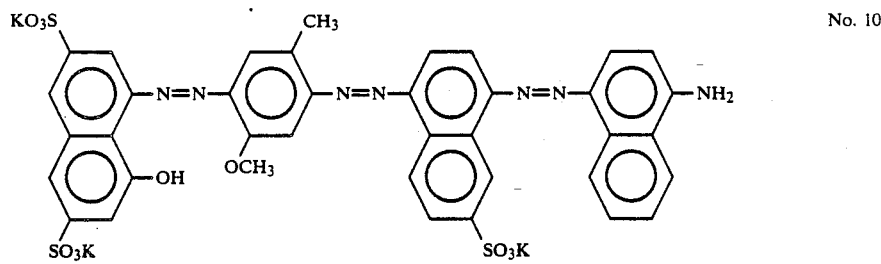
No. 10
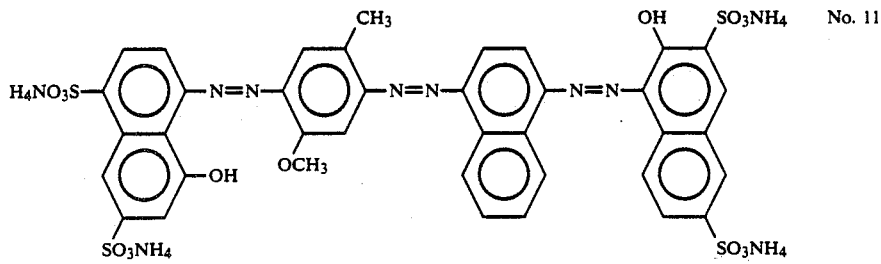
No. 11

No. 12

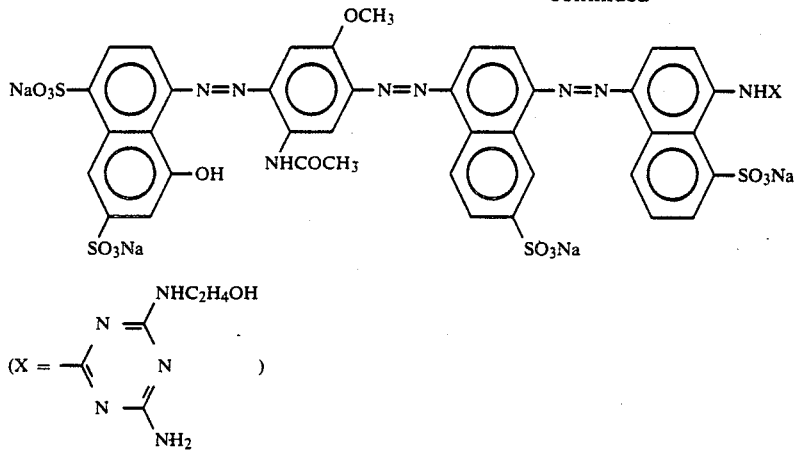

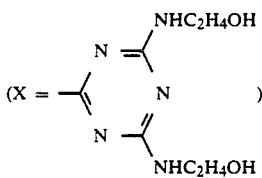

Among the above, particularly preferred are the compounds wherein $R_1$ and $R_2$ are selected from the group consisting of methyl, methoxy, ethoxy and acetyl amino: $R_3$ is —$SO_3M$; $R_4$ is —$SO_3M$ or $NHR_5$ where $R_5$ is a phenyl group that may have a substituent, or a group of the formula (X = a triazine with NHC₂H₄OH substituents)

The number of —$SO_3M$ in the molecule is preferably from 3 to 4, in consideration of the solubility into the liquid medium.

The dyes as exemplified in the above can be prepared following the syntheses of azo dyes known in the art. An example of the synthesis of the above No. 5 dye will be described below.

0.1 mol of H acid is dispersed in 500 ml of water, to which 0.3 mol of hydrochloric acid is added, and then 0.1 mol of sodium nitrite dissolved in 50 ml of water is added at 0° to 5° C. to effect diazotization. In a mixed solution of 200 ml of water and 0.2 mol of hydrochloric acid, 0.1 mol of 5-acetylamino-o-anisidine is dissolved, and the above diazotized solution is added &hereto at 6° to 10° C. The mixture is adjusted to pH 5 to 6 using sodium acetate, and then stirred for 2 hours. The temperature is raised to 60° C., followed by salting out with a common salt and the precipitate is filtered.

The cake is dissolved in 500 mO of water under weakly alkaline conditions, to which 0.3 mol of hydrochloric acid is added, followed by ice cooling. To the resulting solution. 0.1 mol of sodium nitrite dissolved in 50 mO of water is added at 0° to 5° C. to effect diazotization. 0.1 mol of 1-naphthylamine-7-sulfonic acid is dissolved in 300 mO of water, under weakly alkaline conditions, and the above diazotized solution is added in the resulting solution at 5 to 10° C., Which is then adjusted to pH 5 to 6 using sodium acetate, and stirred for 3 hours, followed by salting out with a common salt, and then the precipitate is filtered.

The cake is dissolved in 600 mO of water under weakly alkaline conditions, to which 0.3 mol of hydrochloric acid is added, and then 0.1 mol of sodium nitrite dissolved in 50 mO of water is added at 0° to 5° C. to effect diazotization. In 300 mO of water, 0.1 mol of sodium 1-naphthylamine-8-sulfonate is dissolved, and the above diazotized solution is poured therein under ice cooling. The mixture is stirred for 6 hours at a pH of 5 to 6 and a temperature of 5° to 10° C. Salting out with a common salt is repeated several times to remove impurities. Thereafter, using a strongly acidic ion exchange resin, the sulfonic acid group of the dye is converted to a free acid type ($SO_3H$), followed by neutralization using monoethanolamine, and then desalting purification by the use of an ultrafiltration apparatus (manufactured by Saltrius Co.). The above No. 5 dye is thus obtained.

There are no particular limitations on the amount of the dye to be used in the ink of the present invention. In general, however, it may be an amount that holds from 0.1 to 15 % by weight, preferably from 0.3 to 10 by weight, and more preferably from 0.5 to 6% by weight, based on the total Weight of the ink.

The aqueous medium preferably used in the ink of the present invention is water, or a mixed solvent of water with a water soluble organic solvent. Particularly preferably used is the mixed solvent of water with a water soluble organic solvent, containing as the Water-soluble organic solvent a polyhydric alcohol having the effect of preventing drying of an ink. As the water, it is preferred not to use commonly available water containing various ions, but to use deionized water.

The water soluble organic solvent used by mixture with the water includes, for example, alkyl alcohols having 1 to 5 carbon atoms, such as methyl alcohol, ethyl alcohol, n-propyl alcohol, isopropyl alcohol, n butyl alcohol, sec-butyl alcohol, tert-butyl alcohol, isobutyl alcohol, and n-pentanol; amides such as dimethylformamide and demethylacetamide ketones or ketoalcohols such as acetone and diacetone; ethers such as tetrahydrofuran and dioxane; polyalkylene glycols such as polyethylene glycol and polypropylene glycol; alkylene glycols comprising an alkylene group having 2 to 6 carbon atoms, such as ethylene glycol, propylene glycol, butylene glycol, triethylene glycol, 1,2,6-hexanetriol, thiodiglycol, hexylene glycol, and diethylene glycol; glycerol; lower alkyl ethers of polyhydric alcohols, such as ethylene glycol monomethyl or monoethyl ether, diethylene glycol monomethyl or monoethyl ether, and triethylene glycol monomethyl or monoethyl ether; lower dialkyl ethers of polyhydric alcohols, such as triethylene glycol dimethyl or diethyl ether and tetraethylene glycol dimethyl or diethyl ether; sulfolane; N-methyl-2-pyrrolidone; and 1,3-dimethyl-2 imidazolidinone.

Suitable solvents are selected from the organic solvents as described above and put into use. Particularly important from the view point of preventing the clogging with ink is glycerol or a polyethylene oxide with a degree of polymerization of 2 to 6. Taking account of the image density and ejection stability, preferred are nitrogen-containing cyclic compounds, such as N methyl 2 pyrrolidone, 1,3-dimethyl-2-imidazolidinone and so on, or ether compounds of polyalkylene oxides, such as diethylene glycol monomethyl or monoethyl ether, triethylene glycol monomethyl or monoethyl ether and so on. Further taking account of the frequency response, it is preferred to use lower alcohols, such as ethyl alcohol, n propyl alcohol, isopropyl alcohol and so on, or surface active agents. Hence, the solvent composition preferred in the present invention contains the components as described above in addition to the water.

The above water soluble organic solvent may be contained in the ink in an amount of generally from 2 to 80% by weight, preferably from 3 to 70% by weight, and more preferably from 4 to 60% by weight, based on the total weight of the ink.

The water to be used may be in a proportion such that it holds not less than 35% by weight, and preferably not less than 45% by weight, of the whole ink. An excessively small amount of water may result in a large quantity of a low-volatile organic solvent remaining in the image formed, which may cause undesirably problems of migration of dyes, feathering of images, and so forth.

In addition to the above components, the ink of the present invention may also optionally contain pH adjustors, viscosity modifiers, surface tension modifiers, and so forth. The pH adjustors used in the above ink include, for example, all sorts of organic amines such as diethanolamine and triethanolamine, inorganic alkali agents such as hydroxides of alkali metals as exemplified by sodium hydroxide, lithium hydroxide and potassium hydroxide, organic acid salts such as lithium acetate, organic acids, and mineral acids.

The ink of the present invention, as described above, may preferably have physical properties of a viscosity at 25° C., of from 1 to 20 cP, and preferably from 1 to 15 cP; a surface tension of not less than 30 dyne/cm, and preferably no& less than 40 dyne/cm; and a pH of approximately from 4 to 10. .

The recording process of the present invention is characterized by using the ink described above, and there are no particular limitations on a recording system and a recording medium. In particular, however, particularly effective are the methods in Which an ink-jet system is used as the recording system and a coated paper is used as the recording medium.

The ink jet system may include any conventionally known systems, Without any particular limitations. In the present invention, however, the system as disclosed in Japanese Patent Laid-Open No. 54-59936 is particularly useful, which is a system in which heat energy is acted on an ink to cause therein an abrupt volume change and the ink is ejected from a nozzle by the force of action attributable to this change in state.

Namely, in this system, conventional inks have tended to cause deposition of foreign matters on a heating head to cause the trouble of no ejection of ink. However, the ink of the present invention, which does not cause such deposition of foreign matters, is feasible for stable recording.

As the recording medium used in the present invention, any recording mediums can be used such as commonly available plain papers such as wood free papers, coated papers, and plastic films for OHP. A remarkable effect can be exhibited particularly when the coated papers are used.

The coated papers refer to those which are comprised of wood free paper used as a substrate, and provided on the surface thereof an ink receiving layer comprising a pigment and a binder, aiming at improvements in the color forming properties attributable to ink, sharpness, and dot shapes.

In the case of these coated papers, those which employ as the pigment a fine pigment such as synthetic silica having a BET specific surface area of from 35 to 650 $m^2/g$ can provide images having excellent color forming properties and sharpness. When conventional inks are used, however, the image formed particularly With a black ink may seriously cause the problem of browning with lapse of time, though its theoretical reasons are unknown, and great problems are also caused in not only black monochromatic images but also full color images. Similar problems are also caused in recording mediums comprised of, like these coated papers, a thin layer comprising a pigment and a binder on a paper substrate, where fibers of the paper that constitute the substrate are present in this layer in a mixed state.

It has been found that use of the ink of the present invention does not cause the problems of browning as discussed above even when monochromatic images or full-color images are formed on coated papers as mentioned above. Thus, the process according to the present invention can provide recorded images that may not bring about any indoor color change for a long period of time, when using not only the coated papers employing the pigment having a BET specific surface area of from 35 to 650 $m^2/g$, but also coated papers employing a pigment having a BET specific surface area smaller than that, and also plain papers and any other recording mediums.

The recording processes according to the ink-jet system and the various recording mediums are known in the art, or proposed in variety by the present applicants and others. These recording processes and the recording mediums can all be used in the present invention as they are.

The ink of the present invention is preferably used in a ink jet recording method in which ink droplets are discharged by employing thermal energy. However, the recording solution can also be used for general writing utensils.

An example of the recording apparatus which is perferable for recording by using the ink of the present invention is an apparatus in which ink droplets are produced by applying heat energy to the ink in the chamber of a recording head in correspondence with a recording signal.

Figure 1B:
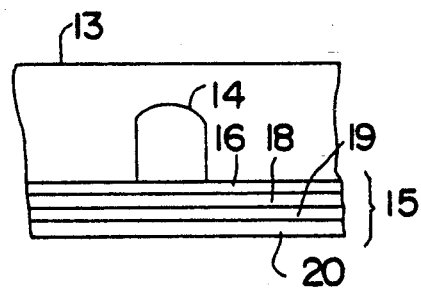
Figure 2:
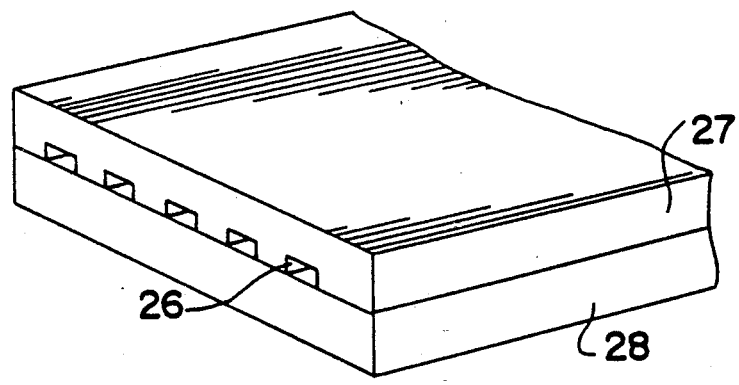
FIG. 2 is a perspective view of the appearance of a multiple head which comprises the head shown in FIG. 1.

FIGS. 1(a), 1(b) and 2 show examples of the structure of a head, which is a principle part of an ink jet recording apparatus.

In the drawings, a head 13 is formed by bonding a glass, ceramic or plastic plate, which has a groove 14 for allowing ink to pass therethrough, and heating head 15 used for heat-sensitive recording. Although a thin film head is shown in the drawings, the head is not limited to such an embodiment. The heating head 15 comprises a protective film 16 made of silicone oxide or the like, aluminum electrodes 17-1, 17-2, a heating resistor layer 18 made of nichrome or the like, a heat-accumulating layer 19 and a substrate 20 made of aluminum or the like and having good heat radiation properties.

Ink 21 reaches a discharging orifice (micropore) 22 and forms a meniscus 23 at pressure P.

When an electrical signal is applied to the electrodes 17-1, 17-2, a region off the heating head 15, which is denoted by n, rapidly generates heat so as to generate air bubbles in the ink 21 which contacts with the region. The meniscus 23 is projected by the pressure generated, and the ink 21 is discharged as a jet of ink droplets 24 from the orifice 22. The droplets 24 are propelled toward a recording material 25. FIG. 2 shows a multiple head comprising a plurality of the heads shown in FIG. 1(a) which are arranged in parallel. The multihead is formed by bonding a glass plate 27 having a plurality of grooves 26 and a heating head 28, which is the same as that shown in FIG. 1(a).

FIG. 1(a) is a sectional view taken along the ink flow channel of the ink, and FIG. 1(b) is a sectional view taken along the line A-B in FIG. 1(a).

Figure 3:
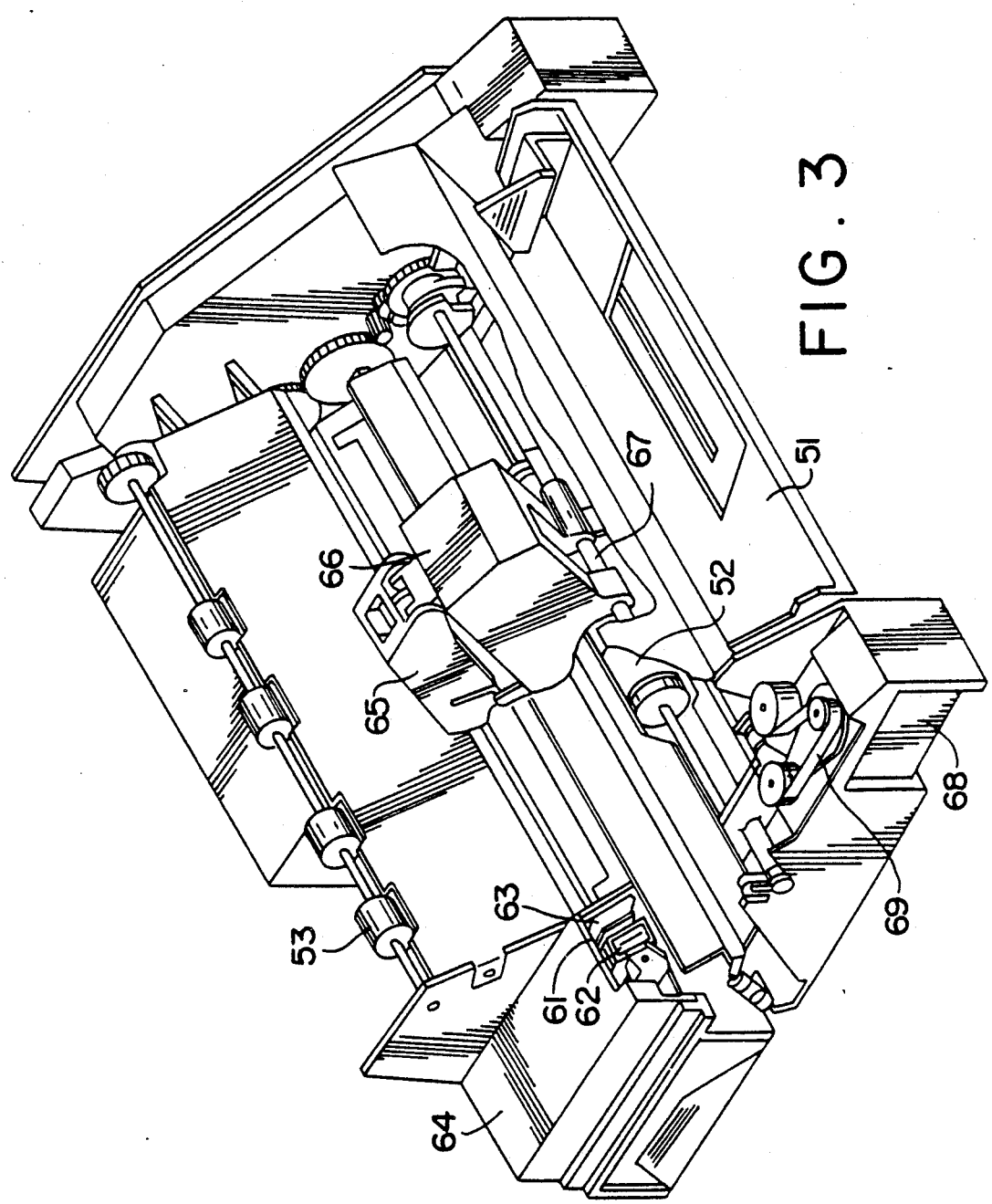
FIG. 3 is a perspective view of an example of an ink jet recording apparatus.
Figure 4:
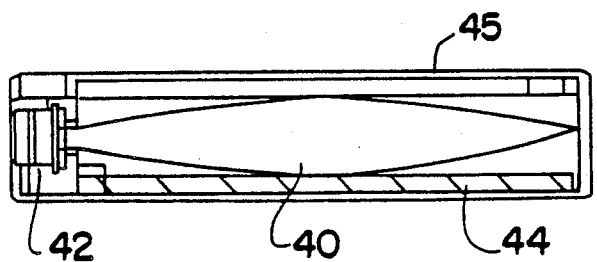
FIG. 4 is a longitudinal sectional view of an ink cartridge.

FIG. 3 shows an example of an ink jet recording apparatus in which the head shown in FIG. 1 is incorporated.

In FIG. 3, reference numeral 61 denotes a blade serving as a wiping member in the form of a cantilever in which one end is a fixed and held by a blade holding member. The blade 61 is disposed at a position adjacent to a region of recording by a recording head. In this example, the blade 61 is held in a position in which it projects in the path of the movement of the recording head. Reference numeral 62 denotes a cap which is disposed at a home position adjacent to the blade 61 and which is moved in the direction vertical to the moving direction of the recording head so as to contact with the orifice surface for the purpose of capping. Reference numeral 63 denotes an ink absorber which is disposed at a position adjacent to the blade 61 and which is held in a position in which it projects in the path of the movement of the recording head in the same way as the blade 61. The blade 61, the cap 62 and the absorber 63 form a discharging recovery part 64. Moisture and dust on the ink orifice surface are removed by the blade 61 and the absorber 63.

Reference numeral 65 denotes the ink jet device which has a means for generating discharging energy so as to record an image by discharging the ink to the recording material opposite to the orifice surface having orifices. Reference numeral 66 denotes a carriage for moving the ink jet device 65 which is loaded thereon. The carriage 66 is slidably engaged with a guide shaft 67 and is partially connected (not shown) to a belt 69 which is driven by a motor 68. This permits the carriage 66 to move along the guide shaft 67 and move in the region of recording by the ink jet device 65 and the region adjacent thereto.

Reference numeral 51 denotes a sheet feeding part, and reference numeral 52 denotes a sheet feeding roller which is driven by a motor (not shown). This arrangement allows the recording paper to be fed to a position opposite to the orifice surface of the recording head and to be delivered to a take-off part having a take-off roller 53 during the progress of recording.

In the aforementioned arrangement, when the ink jet device 65 is returned to the home position at the end of recording, the cap 62 is retracted from the path of the movement of the ink jet device 65, which the blade 61 is projected in the path of the movement. As a result, the orifice surface of the ink jet device 65 is wiped by the blade 61. When the cap 62 contacts with the orifice surface of the recording head 65 so as to cap it, the cap 62 is moved so as to project in the path of the movement of the ink jet device 65.

When the ink jet device 65 is moved from the home position to the recording start position, the cap 62 and the blade 61 are at the same positions as the above-described positions in wiping. As a result, the orifice surface of the ink jet device 65 is wiped even during the movement of the ink jet device 65.

The recording head 65 is moved to the home position adjacent to the recording region not only at the end of recording and during the recovery of discharging (the operation of sucking an ink from an orifice in order to recover the normal discharge of an ink from an orifice), but also at predetermined intervals when it is moved in the recording region for the purpose of recording. This movement causes the above-described wiping.

FIG. 45 is a drawing which shows an example of an ink cartridge 45 of containing the ink to be supplied to the head through an ink supply tube. In the drawing, reference numeral 40 denotes an ink bag for containing the ink to be supplied which has a rubber stopper 42 at its one end. When a needle (not shown) is inserted into the stopper 42, the ink contained in the ink bag 40 can be supplied to the ink jet device 65. Reference numeral 44 denotes an ink absorber for absorbing waste ink. As the ink bag in the present invention, there may preferably be used ones of which the surface coming into contact with the ink is formed from polyolefins, in particular polyethylene.

The ink jet recording apparatus used in the present invention is not limited to an apparatus in which a device and an ink cartridge are separately disposed, as described above. The ink jet device shown in FIG. 5 in which a device and an ink cartridge are integrated can be preferably used in the present invention.

Figure 5:
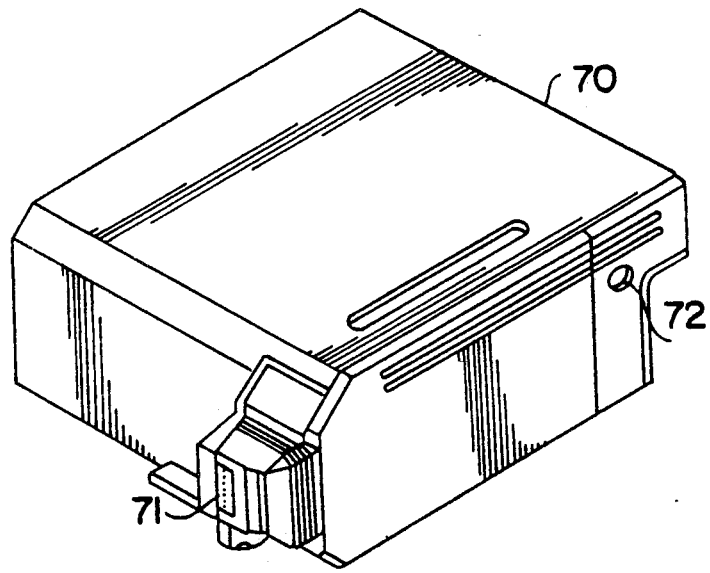
FIG. 5 is a perspective view of an ink jet device.

In FIG. 5, reference numeral 70 denotes an ink jet device which contains an ink storing member impregnated with ink. The ink in the ink storing member is discharged as ink droplets from a head part 71 having a plurality of orifices. Further, as the ink storing member, there may be used an ink absorber or an ink bag. The head is the same as those referred to in FIGS. 1 and 2.

Reference numeral 72 denotes a communicating hole for allowing the inside of the device 70 to communicate with the atmosphere. As a material for the ink absorber in the present invention, there may preferably be used polyurethanes.

The ink jet device 70 is used in place of the ink jet device 65 shown in FIG. 3 and is detachably provided on the carriage 66.

EXAMPLES

The present invention will be described below in detail by giving Examples and Comparative Examples. In the following, "%" is by weight unless particularly mentioned.

(1) Ink Preparation Examples:

Components as shown below were mixed, thoroughly stirred and dissolved, followed by pressure filtration using Fluoropore Filter (trademark; available from Sumitomo Electric Industries, Ltd.) with a pore size of 0.45 μm, to prepare inks of the present invention.

| Example 1 | |
|---|---|
| Exemplary Dye No. 1 | 4% |
| Thiodiglycol | 5% |
| N-methyl-2-pyrrolidone | 10% |
| Water | 81% |
| Example 2 | |
| Exemplary Dye No. 3 | 2% |
| Diethylene glycol | 15% |
| Water | 83% |
| Example 3 | |
| Exemplary Dye No. 5 | 5% |
| Diethylene glycol | 15% |
| Glycerol | 2% |
| Ethyl alcohol | 4% |
| Water | 79% |
| Example 4 | |
| Exemplary Dye No. 6 | 3.5% |
| 1,3-Dimethyl-2-imidazolidinone | 8% |
| Ethylene glycol | 12.5% |
| Water | 76% |
| Example 5 | |
| Exemplary Dye No. 10 | 4% |
| Polyethylene glycol (average molecular weight: 300) | 15% |
| N-methyl-2-pyrrolidone | 15% |
| Water | 76% |
| Example 6 | |
| Exemplary Dye No. 12 | 3% |
| Glycercol | 6% |
| Diethylene glycol | 14% |
| Water | 77% |

(2) Use Examples:

The inks of Examples 1 to 6 were each set on the ink-jet printer BJ-80A (manufactured by Canon Inc. nozzle size: 50×40 μm: nozzle number: 24) that utilizes a heating element as an ink ejection energy source, and printing was carried out on the following recording mediums A to C, under which evaluation was image on the clogging observed when the printing was stopped for a while and then again started, the performance of recovery from the clogging, observed when the printing was stopped for a long term and then again started, and the color change resistance.

Recording medium A: Ink-jet coated paper, NM (trade name; available from Mitsubishi Paper Mills, Ltd.)

Recording medium B: Ink-jet coated paper, FC-3 (trade name; available from Jujo paper Co., Ltd.

Recording medium C: Copy paper, Canon PAPER DRY (trade name; available from Canon Sales Inc.)

(3) Evaluation Method and Evaluation Results:

(i) Clogging observed when the printing was stopped for a while and then again started:

Judgement was made on whether defective prints such as blurs and defects of characters are seen or not, when the printing was stopped after alphanumeric characters were continuously printed on the recording medium C for 10 minutes using the printer filled with a given ink, and then the alphanumeric characters were again printed after the ink was left to stand for 10 minutes without capping on a nozzle or the like (which was left to stand at 20±5° C. under 50±10% RH). As a result, no defective prints were seen.

(ii) Performance of recovery from clogging observed When the printing was stopped for a long term and then again started:

Judgement was made on how many times the operation for recovery had to be repeated to enable normal printing free from blurs or defects of characters, when the printing was stopped after alphanumeric characters were continuously printed on the recording medium C for 10 minutes using the printer filled with a given ink, and the operation for recovery of the clogging of nozzles were carried out after the ink was left to stand for 7 days without capping on a nozzle or the like (which was left to stand at 60° C. under 10±5% RH). As a result, normal printing became possible after the recovery operation was made once to five times.

(iii) Color change resistance:

Black solid patterns of 10 mm×30 mm were each printed on the recording mediums A, B and C. Thereafter, as a color change promotion means, the print was left to stand for 30 minutes in a light-intercepted chamber in ethic the density of ozone was always kept within the range of 0.1±0.05% by volume, and the color differences $\Delta E^*ab$ after and before the test were measured (according to JIS Z8730). As a result, the $\Delta E^*ab$ was found to be not more than 5 in all instances.

(4) Comparative Examples:

The above Examples were repeated to prepare 6 kinds of inks, except that the dyes used in the above Ink Preparation Examples 1 to 6 were replaced with C.I. Food Black 2, C.I. Direct Black 62, C.I. Direct Black 118, C.I. Acid Black 24, C.I. Acid Black 26, and C.I. Acid Black 60, respectively. Then the above Use Example was repeated using the recording apparatus to give black solid prints on the recording mediums A and B. Using the resulting prints as test pieces, similar tests were carried out using the above ozone test chamber. As a result, the $\Delta E^*ab$ was found to be not less than 15 in all instances. Further, with respect to each ink in Examples 1 to 6, the ink absorber of the ink-jet device as shown in FIG. 5 was impregnated with the ink. Then the ink jet apparatus as shown in FIG. 3 was allowed to carry the ink-jet device. By use of the ink jet apparatus, recording was performed. As a result, good recording which was excellent in a discharge property could be realized.

As described in the above, the present invention have made it possible to form an image not only having superior performances such a clogging resistance of inks, as generally required, but also having a superior color change resistance.

We claim:

1. An ink comprising a dye and a liquid medium, wherein said dye is a dye of Formula (I):

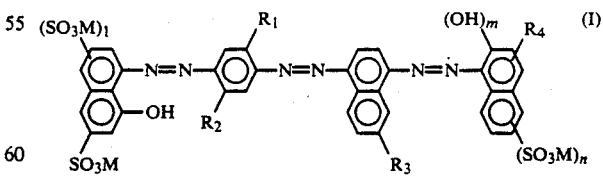

wherein $R_1$ and $R_2$ represent independently an alkyl group, an alkoxy group or an acetylamino group; $R_3$ represents —$SO_3M$ or a hydrogen atom; $R_4$ represents a hydrogen atom, —$SO_3M$ or —$NHR_5$, where $R_5$ represents a hydrogen atom, a phenyl group that may have a substituent, or a group of the formula

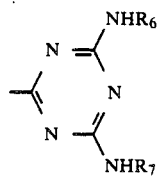

where $R_6$ and $R_7$ represent independently a hydrogen atom or $-C_2H_4OH$; M represents an alkali metal, an ammonium group or an organic ammonium group; and l, m and n represent independently an integer of 0 or 1, wherein said dye is contained in an amount ranging from 0.1 to 15% by weight based on the total weight of the ink, and wherein said liquid medium comprises a water-soluble organic solvent and water.

2. The ink according to claim 1, wherein said water-soluble organic solvent is contained in an amount ranging from 2 to 80% by weight based on the total weight of the ink.

3. The ink according to claim 1, wherein said water is contained in an amount of at least 35% by weight based on the total weight of the ink.

* * * * *